Sept. 6, 1966 W. E. BRADLEY 3,271,687

FREQUENCY CONVERTER EMPLOYING MOLECULAR CONVERSION MEDIUM

Filed May 15, 1961 2 Sheets-Sheet 1

INVENTOR.
WILLIAM E. BRADLEY
BY
Robert D. Sanborn
ATTORNEY

INVENTOR.
WILLIAM E. BRADLEY
BY
Robert D. Sanborn
ATTORNEY

United States Patent Office 3,271,687
Patented Sept. 6, 1966

3,271,687

FREQUENCY CONVERTER EMPLOYING MOLECULAR CONVERSION MEDIUM

William E. Bradley, Washington, D.C., assignor, by mesne assignments, to Philco Corporation, Philadelphia, Pa., a corporation of Delaware Filed May 15, 1961, Ser. No. 110,199
10 Claims. (Cl. 325—448)

The present invention relates to frequency converters and more particularly to frequency converters for the millimeter and near optical frequency ranges.

Crystals of silicon and germanium may be used as frequency converters at frequencies below approximately 70,000 megacycles. However even at 70,000 megacycles crystal frequency converters have a high noise level and are relatively inefficient and the efficiency decreases rapidly as the frequency increases.

It is now well known that energy in the millimeter, near optical and optical frequency ranges may be generated and/or amplified by circuits which detect the energy released by the transition from one coupled state to another of the molecules of an electromagnetic wave resonant gas such as ammonia. It is known, for example, that if gaseous ammonia is so treated that there are more ammonia molecules in the upper of a pair of coupled inversion energy states than in a lower of that pair of inversion states, the gas is capable of releasing energy having a characteristic very precisely defined inversion frequency which lies in the microwave band between 16 kilomegacycles and 40 kilomegacycles. If the gas in this condition is confined within a cavity resonator dimensioned to resonate near the given inversion frequency, microwave energy at this frequency may be extracted from the resonator by means of conventional coupling loops, probes or apertures.

Ammonia and other electromagnetic wave resonant gases have several paired or coupled inversion states. It has been suggested in the past that frequency conversion might be achieved by pumping or exciting a reasonant gas at a frequency corresponding to the transition between a first state and a second state, further pumping or exciting the gas at a frequency corresponding to the transition from said second state to a third state and finally detecting energy at the sum or difference frequency which results from the transition of said gas from said third state to said first state. This is similar to the mode of operation employed in three-level solid state masers. Frequency converters of this type are of limited value since the bandwidth of each of the transition lines is extremely narrow and the two input frequencies are restricted to the available transition frequencies for the selected conversion medium.

It is an object of the present invention to provide a novel frequency converter which employs the transition between different energy states in the conversion process, the converter being so constructed that the input and/or output frequencies are not restricted to unperturbed transition frequencies of the medium.

Another object of the present invention is to provide a novel frequency converter which employs a resonant gas as the conversion medium, the converter being so constructed that the input frequencies are not restricted to unperturbed energy state transition frequencies of the gas.

An additional object is to provide a maser amplifier system for effecting the low noise amplification of low frequency signals.

Another object is to provide a low noise frequency converter associated with a maser amplifier whereby low noise conversion and amplification can be accomplished at frequencies other than those characteristic of the maser amplifier.

It is a further object of the present invention to provide a low noise frequency converter means for heterodyning a microwave signal with a low amplitude, low frequency, amplitude or frequency modulated signal.

Still another object of the present invention is to provide a low noise frequency converter for heterodyning a low amplitude microwave signal with a relatively large amplitude, low frequency signal.

In general these and other objects of the present invention are achieved by providing means for creating a source of molecules in which there is an excess of molecules in the upper one of a pair of coupled energy states. Additional means are provided for subjecting said upper state molecules to an oscillating electromagnetic perturbation field. In certain preferred embodiments of the invention this oscillating electromagnetic perturbation field may be composed of two or more subfields established by separate energy sources having frequencies such that the sum or difference of the frequencies of the fields is equal to a selected unperturbed transition frequency. Means separate from the last-mentioned means are provided for extracting energy from the conversion medium in response to transitions of upper state molecules to the lower of the two coupled states.

For a better understanding of the present invention together with other and further objects thereof reference should now be had to the following detailed description which is to be read in conjunction with the accompanying drawings in which.

Figures 1, 1A, 1B, 1C, 1D, 1E, 6:
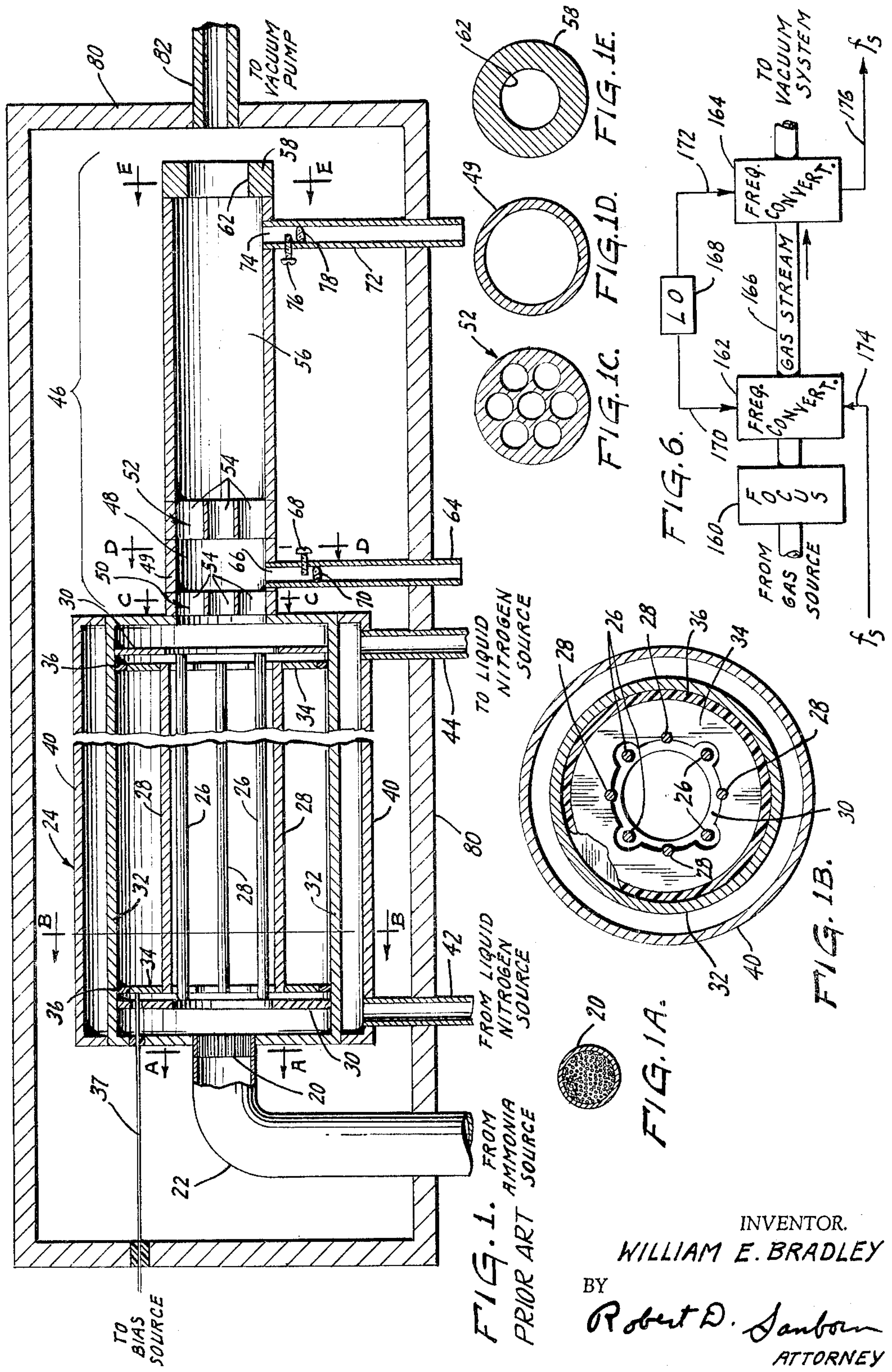
FIG. 1. PRIOR ART, FIG. 1A, FIG. 1B, FIG. 1C, FIG. 1D, FIG. 1E, FIG. 6
FIG. 1 is a block diagram of a two-cavity gas maser amplifier.
FIGS. 1A through 1E are cross-sectional views of the amplifier structure of FIG. 1.
Figure 5:
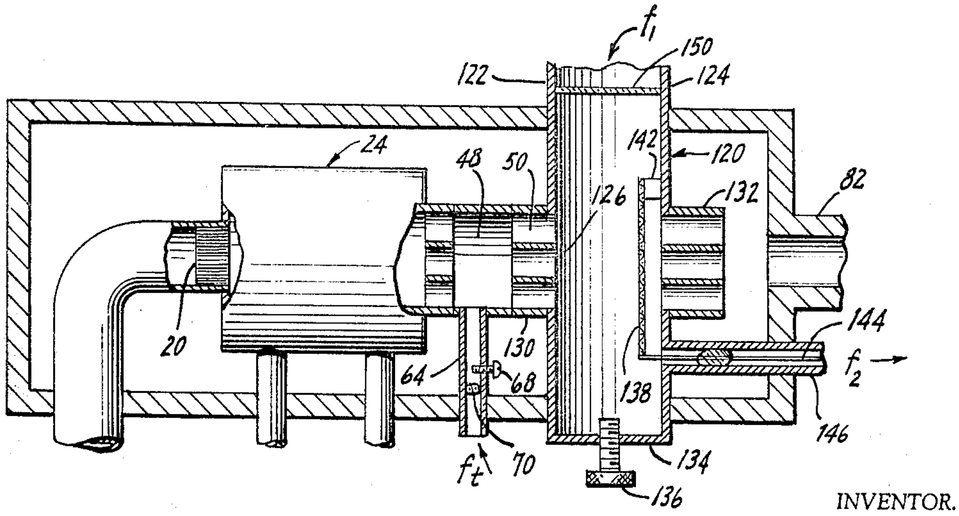

FIG. 5 is a view, partly in section of a second preferred form of frequency converter; and FIG. 6 is a fragmentary view partially in block form of a system for effecting the low noise amplification of low frequency signals which employs two frequency converters, one to raise the signal frequency to maser frequency before amplification and one to lower the frequency of the amplified signal to the original signal frequency.

Before proceeding with a detailed description of the frequency converter of the present invention, the construction and operation of a two-cavity maser amplifier will be briefly described since an understanding of the operation of a maser amplifier will facilitate an understanding of the somewhat more complex frequency conversion process.

FIG. 1 is a pictorial drawing, partly in section, of a two-cavity maser amplifier. The source of the electrical bias potential, the source of ammonia gas and the source of cooling agent for the amplifier necessary for the proper operation of the system of FIG. 1 are represented conventionally by legends since such sources may be conventional in form. Similarly the vacuum system employed to maintain the entire assembly at a low absolute pressure is represented schematically by a legend.

The two-cavity maser amplifier shown in FIG. 1 is provided with a nozzle 20 which causes the microwave resonant gas, for example ammonia gas, supplied by pipe 22 to issue forth as a collimated beam of molecules. In one maser amplifier found to operate satisfactorily in practice, the nozzle 20 comprises a honeycomb of copper approximately .2" in diameter and .25" long which was formed by placing copper plated aluminum wires together in a bundle, pressing them until they were tightly packed and then removing the aluminum with a strong basic etch. The nozzle thus formed comprised hexagonal copper tubes the walls of which were extremely thin. A cross-section of a nozzle of this type is shown in FIG. 1A. It is to be understood that the dimensions and configurations given in this description of the maser amplifier are by way of example only and are not to place any limitations on the frequency converter described and claimed herein.

The gas issuing from nozzle 20 will include molecules in several energy states. A focuser 24 is provided for removing molecules in the lower of two coupled inversion states from the beam while deflecting the corresponding upper state molecules toward the axis of the focuser. The focuser makes use of the interaction between an external electric field and the internal energies of the molecules which is shown as the "Stark effect." In the amplifier illustrated in FIG. 1 the focuser comprises a first set of elongated rod members 26 which are evenly spaced around the circumference of a circle which is centered on the axis of the molecular beam from nozzle 20. A second set of parallel rods 28 is arranged so that rods 26 alternate with rods 28 about the circle. Rods 26 are supported by metallic end rings 30 which make thermal and electrical contact with the inner casing 32 of the focuser. Rods 28 are supported at the two ends by rings 34 which are separated from the inner casing 32 by rings of insulating material 36. An electrical lead 37 which passes through inner casing 32 provides means for applying a high potential to rods 28. In the maser amplifier mentioned above, rods 26 and 28 were stainless steel rods .027″ in diameter and 8″ long with their centers on a circle .45″ in diameter.

The focuser 24 is provided with an outer jacket 40 and inlet and outlet pipes 42 and 44 which comprise means for circulating a cooling medium between outer wall 40 and inner casing 32. Liquid nitrogen may be employed as the cooling medium.

The amplifier of FIG. 1 further comprises a resonator structure 46 which is so constructed that the molecular beam from nozzle 20 and focuser 24 may pass axially therethrough with minimum interference. The resonator structure 46 is formed with a first cavity 48 defined by the outer wall 49 of the resonator structure 46 and end walls 50 and 52, respectively. Cavity 48 is resonant at one of the state transition frequencies of the molecular beam. It has been found that a resonator about .375″ in diameter and .75″ long is resonant at one of transition frequencies of the ammonia beam.

The end walls 50 and 52 provide a minimum of interference with the molecular beam from nozzle 20 but effectively prevent leakage of microwave energy from the cavity 48. It has been found in practice that end walls having these characteristics may be constructed by perforating the end walls with holes 54 having a diameter small compared to the diameter of the cavity 48. For example, eleven holes, each .11 inch in diameter, all located within the outer circumference of cavity portion 48, render the end walls sufficiently transparent to the molecular beam. Each of the holes 54 in walls 50 and 52 may be considered to be a waveguide operating beyond cutoff. An axial dimension of approximately .25″ for wall 50 prevents any substantial amount of leakage of energy from cavity 48 into focuser 24. Wall 52 preferably has a somewhat longer axial dimension, for example .5″, in order to provide sufficient isolation between cavity 48 and a second cavity 56 formed in resonator structure 46.

Cavity 56 is preferably resonant at the same frequency as cavity 48 and therefore may have the same diameter. However the transit time of the gas of the molecular beam through cavity portion 56 is preferably long compared to that through cavity portion 48. This is accomplished by making cavity portion 56 somewhat longer than cavity 48. In the example chosen for illustration, cavity 56 has an axial dimension of 4.07″.

The end wall 58 of cavity portion 56 may be provided with a single axial opening 62 which is also dimensioned to function as a waveguide operating beyond cutoff. It has been found that an opening .3″ in diameter and .5″ long is satisfactory for the specific amplifier described herein.

A waveguide 64 is coupled to cavity portion 48 by way of an iris 66 formed in the outer wall 49 of resonator structure 46. A tuning screw 68 is provided for matching iris 66 to the waveguide 64. A glass bead vacuum seal 70 is provided in waveguide 64. A second waveguide 72 is coupled to cavity portion 56 by way of an iris 74. Again, waveguide 72 is provided with a tuning screw 76 and a vacuum seal 78.

The entire structure thus far described is surrounded by an airtight jacket 80 which makes a vacuum tight seal with pipes 22, 42 and 44, waveguides 64 and 72 and electrical conductor 37. Jacket 80 may be evacuated by means of the exhaust tubulation 82. Since, in the normal operations of a maser amplifier, a continuous stream of electromagnetic resonant gas is introduced into the jacket 80, it is necessary to continuously pump the jacket 80 in order to maintain the desired pressure within the jacket.

Figures 2, 3, 4:
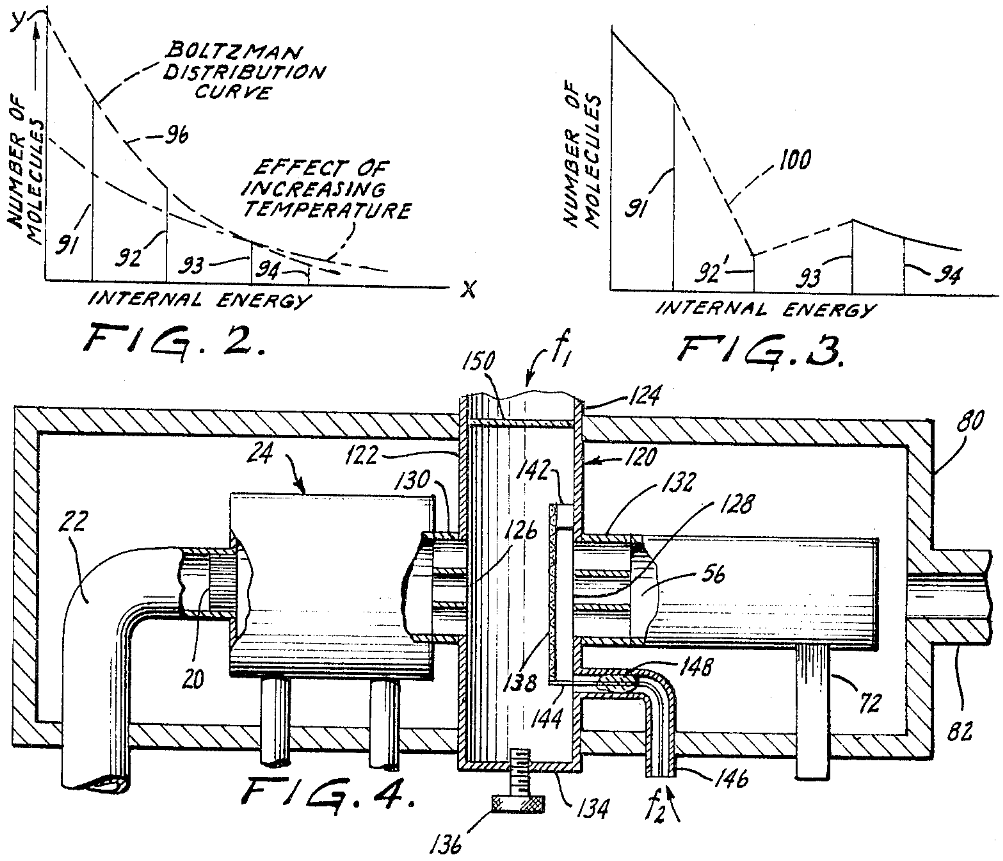
FIGS. 2 and 3 are plots showing the distribution of the molecules among the possible energy states for the amplifier of FIG. 1.
FIG. 4 is a drawing, partly in section, of one preferred form of frequency converter constructed in accordance with the present invention.

The amplifier shown in FIG. 1 operates in the following manner. Ammonia gas at low pressure, for example two millimeters of mercury measured in pipe 22, is allowed to issue into focuser 24 through nozzle 20. The jacket 80 is pumped to a pressure of approximately $1\times10^{-6}$ millimeters of mercury. The molecular beam formed by nozzle 20, if undisturbed, will flow axially through focuser 24 and resonator structure 46, issuing from resonator 46 through opening 62. The molecular beam will be composed of molecules in several different energy states. The number in each state for a given temperature of the gas is represented by the plot of FIG. 2 in which the lines 91–94 represent the various energy states of an ammonia molecule and the vertical length of each of these lines 91–94 represents the number of molecules in that state. The curve 96 which connects the ends of lines 91–94 is known as the Boltzmann distribution curve for the gas.

The transition of a molecule in the upper of a pair of coupled inversion states to the lower of the pair of inversion states may be accompanied by the emission of electromagnetic wave energy at a characteristic inversion frequency. For example, for one pair of inversion states, the so-called 3–3 states, for ammonia the characteristic frequency is 23,870 megacycles per second. The transition from the lower to the upper of a pair of coupled states can be achieved by the absorption of energy at the transition frequency. In a gas in thermal equilibrium there is a continual interchange between a pair of coupled states. However the number of transitions in one direction is exactly equal to the number of transitions in the opposite direction. For this reason as much energy is absorbed as is emitted in a closed cavity.

The ratio of the number of the upper state molecules to the lower state molecules in a pair of coupled inversion states in thermal equilibrium may be expressed as $$\frac{n_2}{n_1}=\epsilon^{\left(\frac{-h\nu}{kT}\right)}$$

where $\epsilon$ is the base of natural logarithms,
$n_2$ is the number of molecules in the upper state,
$n_1$ is the number of molecules in the lower state,
$h$ is Planck's constant,
$k$ is Boltzmann's constant,
$\nu$ is the frequency of the transition, and
T is the temperature of the gas.

The ratio $n_2/n_1$ is less than one for a gas in thermal equilibrium. The ratio $n_2/n_1$ may be made greater than one for a flowing mass of gas by separating a number of lower state molecules from the beam. Since the rate of spontaneous decay from the upper state to the lower state is relatively slow, the excess of upper state molecules will remain for an appreciable distance along the beam.

It is well known that when an ammonia beam passes through a non-uniform electric field, molecules in the lower state of a pair of coupled inversion states are accelerated toward regions of strong field and molecules in the upper state are directed away from the regions of strong field. In the focuser of FIG. 1, the rods 28 are maintained at a high negative potential by the connection of a suitable bias source to lead 37. The grounded rods 26 are maintained at a very low temperature by the liquid nitrogen circulated between walls 32 and 40. As a result of the radial gradient of field strength established by rods 26 and 28, lower state molecules are directed to and trapped, i.e. condensed, on rods 26. The upper state molecules are collimated along the axis of the focuser.

The lifetime of a molecule of ammonia in the upper of a pair of coupled inversion states is relatively long. Therefore, as a result of the elimination of a portion of the lower state molecules in the beam by focuser 24, the number of upper state molecules of the selected pair entering cavity 48 is greater than the number of lower state molecules. This condition of unstable equilibrium is illustrated by the modified distribution curve 100 of FIG. 3. The energy available when this unbalanced distribution returns to equilibrium, i.e. when the excess of upper state molecules revert to the lower of the two coupled states, is used in the two-cavity maser to provide an amplified output signal.

Coherent radiation from the beam in the unbalanced state is obtained if there exists in cavity 48 a low level signal at the transition frequency of the selected inversion state. This causes the molecules to change from a purely randomly oriented upper state to a coherent superposition state, that is, the motions of the molecules are correlated so that when transitions from the upper state to the lower state occur, the energy released by individual transitions will be phase coherent with the energy released by other such transitions and phase coherent with the signals which stimulate the transitions. Since the transit time of the molecules through cavity 48 is relatively short, few, if any, of the stimulated transitions from the upper state to the lower state will take place in cavity 48.

The cavity 56 is dimensioned to resonate at a frequency of approximately 23,870 megacycles, the transition frequency for the selected inversion state of ammonia. The axial dimension of this resonator and hence the transit time of the molecular beam through this cavity is relatively long. Therefore a large number of the molecules in the coherent superposition state passing into cavity 56 through end wall 52 will make the transition from the upper state to the lower state while within resonator 56. The energy release in the course of this transition strongly excites resonator 56.

The probability that a molecule in the upper state will make the transition to the lower energy state while in resonator 56 is a function of the amplitude of the emission stimulating signal supplied to cavity 48. If the constants of the maser are so selected that, for any signal amplitude less than the peak value of the signal supplied to cavity 48, less than all of the excess upper state molecules make the transition to the lower state in cavity 56, the number of excess upper state molecules making the transition in cavity 56 will be proportional to the amplitude of the signal supplied to cavity 48. Thus, for the conditions mentioned above, the amplitude of the oscillation in cavity 56 will be directly proportonal to, but may be much larger than, the amplitude of the oscillation in cavity 48. The increase in energy is obtained from the coherent emission of energy from the molecules as they make the transition from the upper state to the lower state. It will be seen that the system of FIG. 1 acts as an amplifier with the input signal being supplied to waveguide 64 and the amplified output signal being obtained from waveguide 72.

Proceeding now to the description of the novel frequency converter which comprises the present invention, I have discovered that whereas a molecule can accept or radiate energy only in certain quantum amounts and hence only at certain very specific frequencies, the stimulation of the molecules to a condition at which such radiation of energy will occur may be accomplished by energy at frequencies other than the so-called transition frequencies. In this respect the stimulation phenomenon differs sharply from the actual transition phenomenon. In order that the molecules may be stimulated at frequencies other than the so-called transition frequencies, certain specific conditions must be met. I have discovered that if the molecules of gas are undisturbed by collision long enough to accomplish the desired state transitions, the desired state transitions may be induced by stimulating upper state molecules with energy at two or more frequencies, for example at frequencies $f_1$ and $f_2$ which are so selected that $f_1 \pm f_2$ equals $f_t$, where $f_t$ is a characteristic inversion transition frequency of the molecule. One signal, for example the signal at frequency $f_1$, should be strong enough to produce a substantial perturbation of the energy states of the molecules. This signal corresponds generally to the local oscillator signal in a conventional frequency converter. The second signal, for example the signal at frequency $f_2$, may be the signal which is to be transmitted or received and may be much smaller in amplitude than the first signal. Either or both of the signals may be amplitude-modulated or frequency modulated within a narrow band.

The electric fields corresponding to the signals at frequencies $f_1$ and $f_2$ must be so applied as to occupy the same region of space together with the molecules and must have appropriate directional orientation, that is, they should be oriented so as to interact with electron motion in the same molecules.

One preferred embodiment of the invention which employs an ammonia beam as the conversion medium is shown in FIG. 4. In FIG. 4 pipe 22, nozzle 20 and focuser 24 correspond to similarly numbered elements in FIG. 1. The frequency converter of FIG. 4 further comprises a waveguide 120 which is shown in section. Waveguide 120 is dimensioned to pass a signal having a frequency near but not equal to one of the characteristic transition frequencies of ammonia. The walls 122 and 124 constitute the broad walls of the waveguide. Walls 122 and 124 are provided with openings at 126 and 128, respectively, for the passage of the beam from focuser 24. The walls 130 and 132 at openings 126 and 128 may take the same form and have the same dimensions as the end walls 50 and 52, respectively, of FIG. 1. Waveguide 120 is terminated in a short circuit at 134. A tuning screw 136 is provided for controlling the effective point of termination of the waveguide with respect to the openings 126 and 128.

A wire mesh electrode 138 is supported within waveguide 120 in a plane parallel to the walls 122 and 124 and closer to wall 124 than to wall 122. Electrode 138 is preferably substantially transparent to the ammonia beam. In the embodiment of FIG. 4 electrode 138 is supported by a standoff insulator 142 and a rigid feed conductor 144. Conductor 144 forms the inner conductor of a coaxial line section the outer conductor which is shown at 146. Coaxial line 144–146 is provided with a vacuum seal 148. Waveguide 120 is provided with a vacuum seal 150.

Wall 132 of FIG. 4 forms one end wall of a cavity 56 which corresponds to the similarly numbered cavity of FIG. 1. Waveguide 72, jacket 80 and exhaust tubulation 82 in FIG. 4 all correspond to similarly numbered elements in FIG. 1.

The frequency converter shown in FIG. 4 operates in the following manner. The nozzle 20 and focuser 24 form a collimated beam in which the number of molecules in the upper one of a pair of coupled inversion states exceeds the number of molecules in the lower one of that pair of inversion states. In the collimated beam the molecules in the upper or excited state are relatively immune from collision with other molecules. The local oscillator signal, which may have a frequency of approximately 24 kmc., is supplied to waveguide 120 by conventional means not shown in FIG. 4. This local oscillator signal may be supplied by a klystron, a magnetron or other suitable microwave source. Tuning screw 136 is adjusted so that a potential maximum of the standing wave pattern occurs between walls 122 and 124 at the point of passage of the beam through these walls. As pointed out earlier, the local oscillator signal at frequency $f_1$ is preferably supplied at sufficient amplitude to produce appreciable perturbation of the electron motions of the upper state molecules passing through the waveguide. The second signal having a frequency $f_2$, such that $f_1$ plus or minus $f_2$ equals the selected transition frequency $f_t$, is supplied to the coaxial line 144–146. This signal may be at a relatively low frequency and may be amplitude or frequency modulated. An electrical field at frequency $f_2$ will be established between the mesh electrode 138 and the wall 124 of the waveguide 120. The electrical field set up by electrode 138 will be aligned with that set up by the signal at frequency $f_1$ between walls 122 and 124. The upper state molecules passing through the waveguide by way of openings 126 and 128 will be stimulated by the combined fields to the point that coherent emission will take place at the characteristic transition frequency $f_t$ when the stimulated molecules pass into cavity resonator 56. The stimulated molecules pass through wall 132 into cavity 56 where transition of some of the upper state molecules to the lower state occurs with a consequent excitation of cavity 56. If the amplitude of one of the signals, for example the signal at frequency $f_1$, is much larger than the amplitude of the other signal the number of transitions which will occur in cavity 56 will be a substantially linear function of the amplitude of the lower amplitude signal. Thus, if the signal at frequency $f_1$ has a large and constant amplitude, the signal derived from resonator 56 by way of output waveguide 72 will have an amplitude variation proportional to the amplitude variation of the signal at frequency $f_2$. This signal at waveguide 72 will have a frequency $f_t$ equal to $f_1 \pm f_2$ and an amplitude which may be equal to or larger than the amplitude of the input signal at frequency $f_2$. Thus the combination of FIG. 4 functions as a frequency converter to heterodyne the signals at frequencies $f_1$ and $f_2$ to produce a third signal at frequency $f_t$ which is amplitude-modulated in accordance with the amplitude-modulation of one or both of the input signals.

In an alternative mode of operation, a large amplitude low frequency signal may be supplied by way of coaxial line 144–146 and a relatively weak modulated or unmodulated microwave signal supplied by way of waveguide 120. Again the signal supplied to cavity resonator 56 by the transitions which occur therein will be at a frequency equal to the sum of the two frequencies $f_1$ and $f_2$ and have an amplitude which is a function of the amplitude of the lower amplitude signal, in this instance the microwave signal $f_1$. In yet another alternative mode of operation, two microwave signals at appropriate frequencies may be supplied to waveguide 120 to stimulate the molecules to the condition in which they will make the transition to the lower state.

In the embodiment shown in FIG. 4, the signals $f_1$ and $f_2$ set up electric fields which bring about the stimulation of the upper state molecules. However it is to be understood that in other embodiments of the invention one or both fields may be magnetic rather than electric. The type and direction of the field should be mathematically determined for the class of molecular states employed in a particular embodiment. This mathematical determination consists of deriving the so-called matrix element of the transitions when both the fields of frequency $f_1$ and frequency $f_2$ are present. This matrix element may be calculated by the well-known perturbation theory method.

The frequency converter of FIG. 4 combines two signals which are not at characteristic transition frequencies of the gas and produces a combined signal at one characteristic transition frequency of the gas. In the embodiment shown in FIG. 5 a signal is generated which has a frequency equal to the difference between the frequency $f_1$ of an input signal and a transition frequency $f_t$ of the gas. In FIG. 5 the cavity 48, focuser 24 and nozzle 20 all correspond to the similarly numbered elements in FIG. 1. The waveguide 120 and associated structure correspond to the similarly numbered elements in FIG. 4. The cavity resonator 56 of FIG. 4 is not required in the embodiment in FIG. 5. A signal having a frequency $f_t$, which is equal to the characteristic transition frequency for the selected pair of energy states, is supplied to cavity 48. This signal in cavity 48 stimulates the upper state molecules passing through cavity 48 to a condition where coherent emission of energy can take place. The stimulated molecules pass through end wall 50 into waveguide 120. Waveguide 120 is supplied with a microwave signal at frequency $f_1$ which is different from $f_t$. Upon the transition of upper state molecules to a lower state in waveguide 120, energy at frequency $f_t$ will be released in waveguide 120. Since the transition is an inherently non-linear process, some of the energy at frequency $f_t$ will heterodyne with the frequency $f_1$ supplied to waveguide 120. As a result, a signal at frequency $f_2$, which is equal to the difference between the frequencies $f_t$ and $f_1$, will appear at output coaxial line 144–146. The dimension of waveguide 120 in the direction of gas flow may be increased if necessary to provide a longer transit time of the gas through waveguide 120.

The frequency converter of FIG. 5 is capable of an alternative mode of operation. A signal at frequency $f_t$ may be supplied to cavity resonator 48 and a signal at a low frequency $f_2$ supplied by way of coaxial input 144–146. In this mode of operation a microwave signal at the difference frequency $f_1$ may be extracted from waveguide 120.

It will be obvious to one skilled in the art that the frequency converters of FIGS. 4 and 5 may be operated in cascade with or without an intervening amplifier of the type shown in FIG. 1. One such cascade arrangement is shown in FIG. 6. Focuser 160 of FIG. 6 may be constructed like focuser 24 of FIG. 1. Frequency converter 162 may comprise structure similar to waveguide 120, mesh electrode 138 and coaxial line 144–146 of FIG. 4. Frequency converter 164 may be similar to converter 162. Again, if necessary to obtain the desired gain, converter 164 may be so constructed that the transit time of the gas through converter 164 is longer than transit time through converter 162. Converter 162 is coupled to converter 164 by way of a gas conduit 166 which may have a cross-section as shown at FIG. 1C. A local oscillator 168 is coupled to input 170 of converter 162 and input 172 of converter 164. Local oscillator 168 may be any suitable microwave oscillator, for example a klystron oscillator. Inputs 170 and 172 of FIG. 6 may correspond to waveguide 120 of FIG. 4 and waveguide 120 of FIG. 5, respectively. The signal to be amplified is supplied to input 174 of converter 162 and the amplified signal is obtained from output 176 of converter 164. Again input 174 may correspond to coaxial line 144–146 of FIG. 4 while output 176 may correspond to coaxial line 144–146 of FIG. 5. Mechanical details such as the enclosing jacket 80 of FIGS. 1, 4 and 5 have been omitted in FIG. 6 in order to simplify the drawing.

It is believed that the operation of the system of FIG. 6 will be obvious from the foregoing explanations of the system of FIGS. 1, 4 and 5. A flow of gas is established through converters 162 and 164 by the source and the vacuum system represented by appropriate legends in FIG. 6. Focuser 160 operates to create an excess of molecules in the upper one of a pair of coupled inversion states and to direct these upper state molecules along a path substantially parallel to the axis of conduit 166. A weak radio wave at a frequency which may not correspond to a characteristic transition frequency of the gas being employed is supplied to input 174 of converter 162. The frequency of local oscillator 168 is adjusted so that the sum or difference of the frequencies of the signals supplied to inputs 170 and 174 is equal to a selected transition frequency of the gas employed. The upper state molecules passing through converter 162 will be stimulated by the combined fields in converter 162 to the point that phase coherent emission of energy will take place at the selected characteristic transition frequency of the gas when the stimulated molecules pass into converter 164. Converter 164 is also supplied with a signal from local oscillator 168. The signal appearing at output 176 will have a frequency equal to the selected state transition frequency of the gas plus or minus the frequency of the signal supplied to input 172. If the signal supplied to input 172 of converter 164 is at the same frequency as the signal supplied to input 170 of converter 162, the signal at output 176 will be equal in frequency to the signal supplied at input 174 of converter 162. If the constants of the system of FIG. 6 are properly selected the amplitude of the signal at output 176 will be substantially greater than the amplitude of the signal at input 174 due to the energy released by the phase coherent transitions of the upper state molecules in converter 164. Thus it will be seen that the system of FIG. 6 may be employed as a stable, low noise amplifier of radio waves which are not at a characteristic transition frequency of the gas being employed. The bandwidth of the signals which will be amplified will depend upon the bandwidth of the maser converters 162 and 164. The center frequency of the band will depend upon the frequency of the signal supplied by local oscillator 168. Varying the frequency of local oscillator 168 will cause the effective passbands of converters 162 and 164 to tune over a corresponding frequency range. If local oscillator 168 provides a different frequency signal to inputs 170 and 172 the amplified signal on output 176 will differ in frequency from the signal on input 174 by the difference in frequencies of the signals supplied to inputs 170 and 172. Such a change in frequency may be desirable in certain forms of communications systems to prevent cross talk between adjacent links of the system.

While the invention has been described with reference to certain preferred embodiments thereof it will be apparent that various modifications and other embodiments thereof will occur to those skilled in the art within the scope of the invention. Accordingly I desire the scope of my invention to be limited only by the appended claims.

I claim:

1. A frequency converter employing a molecular conversion medium for heterodyning first and second oscillatory signals, the frequency of at least one of said signals being other than a characteristic transition frequency of said molecular conversion medium, said frequency converter comprising a source for supplying said molecular conversion medium, first means cooperating with said molecular conversion medium supplied by said source for creating in said medium an excess of molecules in the upper one of a pair of coupled inversion states, second means for subjecting said upper state molecules to an electromagnetic perturbation field, third means separate from said second means for extracting energy from said conversion medium in response to transitions of said upper state molecules to the lower of said two coupled states, fourth means for subjecting said upper state molecules to a field at the frequency of said first signal to be heterodyned and fifth means spaced from said fourth means for subjecting said upper state molecules to a field at the frequency of said second signal to be heterodyned, said fourth and fifth means forming a part of said second and third means, means for supplying said first signal to be heterodyned to said fourth means and means for supplying the other of said two signals to be heterodyned to said fifth means.

2. A frequency converter employing a molecular conversion medium for heterodyning first and second oscillatory signals, the frequency of at least one of said signals being other than a characteristic transition frequency of said molecular conversion medium, the sum or difference of the frequencies of said two oscillatory signals being equal to a characteristic transition frequency of said molecular conversion medium, said frequency converter comprising a source of said molecular conversion medium, first means cooperating with said molecular conversion medium supplied by said source for creating an excess of molecules in the upper one of a pair of coupled inversion states, second means responsive to applied signals for subjecting said upper state molecules to an electromagnetic perturbation field, said field having components at frequencies equal to the frequency of each of the signals supplied to said second means, third means separate from said second means for extracting energy from said conversion medium in response to transitions of said upper state molecules to the lower of said two coupled states and means for supplying said first and second signals to be heterodyned to said second means.

3. A frequency converter employing a molecular conversion medium for heterodyning first and second oscillatory signals, the frequency of one of said signals being equal to a characteristic transition frequency of said molecular conversion medium, the frequency of said second signal being other than a characteristic transition frequency of said medium, said frequency converter means comprising a molecular conversion medium, first means cooperating with said molecular conversion medium for creating an excess of molecules in the upper one of a pair of coupled inversion states, second means responsive to said signal having a frequency equal to said characteristic transition frequency for subjecting said upper state molecules to an electromagnetic perturbation field, third means separate from said second means for extracting energy from said conversion medium in response to the transition of said upper state molecules to the lower one of said two coupled states, said third means including means responsive to an applied signal for creating an oscillatory field in the region at which said transitions occur, means for supplying one of said signals to be heterodyned to said second means, means for supplying the other of said signals to be heterodyned to said third means, and means for deriving from said third means a signal having a frequency equal to the sum or difference between the frequencies of said two signals to be heterodyned.

4. A frequency converter comprising first means for establishing a flow of microwave resonant gas, second means for causing said flow of gas to have an excess of molecules in the upper one of a pair of coupled transition states, third means responsive to an applied signal for establishing a field which will interact with upper state molecules passing therethrough, said third means being positioned so as to be traversed by said flow of gas having said excess of upper state molecules, fourth means including energy extracted means positioned so as to be traversed by said gas at a point more remote from said flow establishing means than said third means, means for supplying to one of said means traversed by said gas a first signal to be heterodyned, means for supplying a second signal to be heterodyned to said third means, the frequency of at least one of the two signals to be heterodyned being other than a characteristic transition frequency of said microwave resonant gas, and means for deriving from said fourth means a signal at a frequency equal to the sum or difference of the frequencies of said first and second signals.

5. A frequency converter in accordance with claim 4 wherein said first and second signals are supplied to said third means.

6. A frequency converter in accordance with claim 3 wherein said first signal is supplied to said fourth means and said second signal is supplied to said third means.

7. A frequency converter comprising first means for establishing a flow of microwave resonant gas, second means for causing the flow of gas to have an excess of molecules in the upper one of a pair of coupled transition states, a cavity resonator means, opposed walls of said resonator means being apertured to permit a flow of gas through said resonator means while blocking the flow of microwave energy through said opposed walls, a waveguide means dimensioned to propagate energy in the dominant mode, means within said waveguide for establishing a secondary electric field within said waveguide parallel to the electric field established by microwave energy propagated in said waveguide, the broad walls of said waveguide being formed with openings therein to permit the passage of a gas through said waveguide parallel to the electric field within said waveguide, said cavity resonator, said means within said waveguide and said waveguide being positioned so as to be traversed by said flow of gas, means for supplying a first signal at a frequency other than the characteristic transition freqency of said gas to one of said means traversed by said flow of gas, means for supplying a second signal to another one of said means traversed by said flow of gas, the frequency of any of said first and second signals supplied to said cavity resonator means being equal to said transition frequency and the frequency of any of said first and second signals supplied to the combination of said waveguide means and said means within said waveguide being equal to the difference between said transition frequency and the frequency of said first signal, and means for extracting a signal from the remaining one of said three means traversed by said flow of gas which is not supplied with a signal.

8. A frequency converter in accordance with claim 7 wherein said waveguide means is positioned between said cavity resonator means and said flow producing means and wherein said first and second signals are supplied to said waveguide means and said means within said waveguide, respectively.

9. A frequency converter in accordance with claim 7 wherein said cavity resonator means is positioned between said waveguide means and said flow producing means and wherein said second signal is supplied to said cavity resonator means.

10. A frequency converter employing a molecular conversion medium for heterodyning first and second oscillatory signals, said frequency converter comprising a molecular conversion medium, first means cooperating with said molecular conversion medium for creating in said medium an excess of molecules in the upper one of a pair of coupled inversion states, second means for subjecting said upper state molecules to an electromagnetic perturbation field, third means separate from said second means for extracting energy from said conversion medium in response to transitions of said upper state molecules to the lower of said two coupled states, one of said two last-mentioned means including fourth means for subjecting said upper state molecules to a field at the frequency of an applied signal, means for supplying said first signal to be heterodyned to said second means, means for supplying said second signal to be heterodyned to said fourth means, the frequency of at least one of said first and second signals being other than a characteristic transition frequency of said molecular conversion medium.

References Cited by the Examiner

UNITED STATES PATENTS

| | | | |
|---|---|---|---|
| 2,995,711 | 8/1961 | Peter et al. | 330—4 |
| 3,004,225 | 10/1961 | DeGrasse et al. | 330—4 |

KATHLEEN H. CLAFFY, *Primary Examiner.*

LLOYD McCOLLUM, ROBERT H. ROSE, *Examiners.*

G. J. BUDOCK, R. S. BELL, *Assistant Examiners.*